United States Patent
Carrigan et al.

[11] Patent Number: 5,975,799
[45] Date of Patent: Nov. 2, 1999

[54] ELECTRO-OSMOTIC INFUSION FOR JOULE HEATING SOIL REMEDIATION TECHNIQUES

[75] Inventors: Charles R. Carrigan, Tracy; John J. Nitao, Castro Valley, both of Calif.

[73] Assignee: The Regents of the University of California, Oakland, Calif.

[21] Appl. No.: 08/944,629

[22] Filed: Oct. 6, 1997

[51] Int. Cl.[6] .................................................... B09C 1/06
[52] U.S. Cl. ........................ 405/128; 166/248; 405/131; 588/204; 588/249; 588/900
[58] Field of Search .................... 166/245, 248; 405/128, 131; 588/204, 212, 227, 249, 900

[56] References Cited

U.S. PATENT DOCUMENTS

| | | | |
|---|---|---|---|
| 5,299,887 | 4/1994 | Ensley ....................................... | 405/128 |
| 5,415,744 | 5/1995 | Jacobs .................................. | 588/204 X |
| 5,433,829 | 7/1995 | Pool ...................................... | 166/248 X |
| 5,435,895 | 7/1995 | Lindgren et al. ..................... | 588/204 X |
| 5,458,747 | 10/1995 | Marks et al. ......................... | 588/204 X |
| 5,476,992 | 12/1995 | Ho et al. ................................ | 588/204 |
| 5,545,803 | 8/1996 | Heath et al. ......................... | 405/131 X |
| 5,595,644 | 1/1997 | Doring et al. ....................... | 588/204 X |
| 5,861,090 | 1/1999 | Clarke et al. ......................... | 588/204 X |

Primary Examiner—George Suchfield
Attorney, Agent, or Firm—L. E. Carnahan

[57] ABSTRACT

Electro-osmotic infusion of ground water or chemically tailored electrolyte is used to enhance, maintain, or recondition electrical conductivity for the joule heating remediation technique. Induced flows can be used to infuse electrolyte with enhanced ionic conductivity into the vicinity of the electrodes, maintain the local saturation of near-electrode regions and resaturate a partially dried out zone with groundwater. Electro-osmotic infusion can also tailor the conductivity throughout the target layer by infusing chemically modified and/or heated electrolyte to improve conductivity contrast of the interior. Periodic polarity reversals will prevent large pH changes at the electrodes. Electro-osmotic infusion can be used to condition the electrical conductivity of the soil, particularly low permeability soil, before and during the heating operation. Electro-osmotic infusion is carried out by locating one or more electrodes adjacent the heating electrodes and applying a dc potential between two or more electrodes. Depending on the polarities of the electrodes, the induced flow will be toward the heating electrodes or away from the heating electrodes. In addition, electrodes carrying a dc potential may be located throughout the target area to tailor the conductivity of the target area.

19 Claims, 1 Drawing Sheet

ELECTRO-OSMOTIC INFUSION FOR JOULE HEATING SOIL REMEDIATION TECHNIQUES

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to remediation of volatile contaminants from soil, particular to soil remediation using joule heating technology, and more particularly to electro-osmotic infusion of ground water or chemically tailored electrolyte to enhance, maintain or recondition electrical conductivity for the joule heating remediation technique.

Removal of volatile contaminants, such as gasoline products and industrial wastes, from the soil is being carried out using the known joule heating remediation technique, wherein heating electrodes are utilized to vaporize and drive the contaminants toward an extraction well. A major problem with the joule heating technique is the non-uniform heating of near-electrode soils because of electrode geometry and electrical current distribution. High electrical current densities occur in the soil around the electrodes, which have diameters of less than one foot, when potential differences of several hundred volts are applied to an electrode array. This can result in extremely nonuniform heating of the target soil layer or formation and in total dryout of the near-electrode soil and the complete loss of electrical continuity between electrodes long before significant heating of the far-electrode soil region has been achieved.

The typically low permeability of the joule heating target layer, such as clay, makes it very difficult, if not impossible, to mitigate such effects by simply pumping water into the electrode wells. It has been found that temperatures of many hundreds of degrees can occur near a heating electrode while sub-boiling temperatures exist only a few feet away. Even though electrodes may be separated by fifty or more feet across a zone of contamination, the actual heating effects may be quite localized, involving the soil only a few feet from the electrode. It has also been found that simply adding water to an electrode well to prevent dryout may compound rather than mitigate the problem. First, the water added cannot flow into the target soil layer to prevent dryout because of the low permeability of that layer. Second, adding water to a hot well produces steam at the well that represents thermal energy lost to the target soil layer. Third, the steam produced can flow into adjacent higher permeability layers so that the temperature and saturation of these layers increases, which increases the electrical conductivities of these adjacent layers, causing a shunt of current around the target layer and subsequent decrease in the heating of that layer.

The above problems relating to soil remediation by joule heating techniques are overcome by the present invention which involves a process in which electro-osmotic infusion is utilized to provide a supply of electrolyte or ground water to the zone of intense heating around the joule heating electrodes. This is achieved by applying a direct current (dc) electrical field between electrode wells emplaced in the target soil layer or formation. The application of the dc electric field interacts with the pore scale distribution of ions to produce a net flow of pore fluid toward electrodes having one of the polarities. Induced flows by electro-osmosis are known and have been used extensively in civil engineering applications to dewater and stabilize soils. The electro-osmotic induced flows can be used to infuse electrolyte with enhanced ionic conductivity into the vicinity of the electrodes, maintain the local saturation of the near-electrode soil region, and resaturate a partially dried out zone.

SUMMARY OF THE INVENTION

It is an object of the invention to provide a process utilizing joule heating and electro-osmotic infusion for soil remediation.

A further object of the invention is to improve the joule heating soil remediation technology.

A further object of the invention is to provide a process for soil remediation which utilizes electro-osmotic infusion of ground water or chemically tailored electrolyte into the target soil formation.

Another object of the invention is to provide electro-osmotic infusion of ground water or chemically tailored electrolyte to enhance, maintain, or recondition electrical conductivity for the joule heating soil remediation technique.

Another object of the invention is to utilize electro-osmosis to tailor the electrical conductivity within a target soil formation.

Another object of the invention is to tailor the electrical conductivity throughout a target soil layer by infusing chemically modified and/or heated electrolyte to improve conductivity contrast of the interior (far-electrode area) of the layer.

Another object of the invention is to provide an improvement to the joule heating soil remediation process by electro-osmotic infusion to condition the electrical conductivity of the soil before and during the joule heating operation.

Other objects and advantages of the present invention will become apparent from the following description and accompanying drawings. Basically, the invention involves electro-osmotic infusion of ground water or chemically tailored electrolyte to enhance, maintain or recondition soil electrical conductivity for the joule heating remediation process. This is achieved by applying a direct current (dc) electric field between electrode wells emplaced in the target soil layer or formation. The application of the dc electric field interacts with the pore scale distribution of the ions to produce a net flow of pore fluid toward electrodes having one of the polarities. By electro-osmosis, electrolyte (either normal groundwater or a specially formulated conductive liquid supplied to non-heating wells) is either drawn towards or away from the joule heating electrode wells to remove excessive heat and thus mitigate groundwater vaporization at the heating electrodes and to maintain saturation so that the heating wells do not dry out during operation causing the electrical conductivity near them to decrease or vanish altogether, or to condition the electrical conductivity of the soil.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
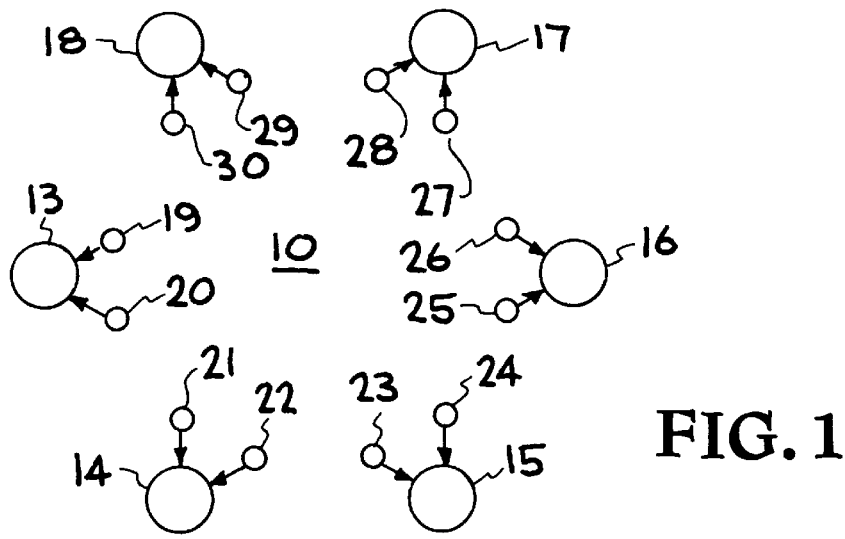
FIG. 1 is a top view of a target area showing an embodiment of an array of joule heating and electro-osmosis electrodes.

The present invention is directed to electro-osmotic infusion of ground water or chemically tailored electrolyte to enhance, maintain, or recondition electrical conductivity of soil for the joule heating soil remediation technique. The joule heating technique is improved by the present invention by the production of electro-osmotic flows in the soil local to the joule heating electrodes and, in a larger scale application, by the production of flows in the entire region central to the joule heating electrode array. The induced flow of ground water or chemically tailored electrolytes using electro-osmosis can be used to infuse electrolyte with enhanced ionic conductivity into the vicinity of the electrodes, maintain the local saturation of the near-electrode region, and resaturate or recondition a partially dried out zone. The present invention can be utilized to tailor the conductivity throughout the soil target layer by infusing chemically modified and/or heated electrolyte to improve the conductivity contrast of the interior of the target layer. Periodic polarity reversals will prevent large pH changes at the electrodes. The invention can be used to condition the electrical conductivity of the soil before and during the heating operation.

The process of this invention is achieved by applying a direct current (dc) electric field between electrode wells emplaced in the target formation. This can be done using many different arrangements. For example, one or more electro-osmotic (EO) electrode wells may be positioned adjacent a joule heating (JH) electrode well, and the dc power supply is connected to both the EO and the JH electrodes to produce the desired dc electric field between electrodes and, depending on the polarity of the electrodes, establish the direction of flow toward or away from the JH electrodes; or the EO electrodes can be located in the interior of the soil target area, and electrically interconnected to infuse tailored electrolyte throughout the target area. The dc electric field interacts with the pore scale distribution of ions to produce a net flow of pore fluid toward electrodes having one of the polarities. By electro-osmosis, electrolyte (either normal groundwater or a specially formulated conductive liquid supplied to the wells) is either drawn towards or away from the joule heating electrode wells to remove excessive heat and thus mitigate groundwater vaporization at the joule heating electrodes and to maintain saturation so that the joule heating wells do not dry out during operation causing the electrical conductivity near them to decrease or vanish altogether.

The electro-osmotically infused water-based electrolyte can be treated to increase both the local ionic conductivity around the heating electrodes and the boiling point of the electrolyte. This decreases both the heating non-uniformity and the soil's tendency to dry out. For example, a saline solution can be added to water and injected into the joule heating wells or the electro-osmotic wells at a desired rate, depending on the needed application. The electro-osmotic infusion can be applied to the entire target area or zone between electrodes where the electrical conductivity of the targeted formation can be increased by infusing electrolyte having an ionic conductivity that is chemically and/or thermally enhanced. For example, saline solution can be added to water heated to a temperature up to the boiling point temperature, and infused into the electro-osmotic wells at a rate determined by the current need to maintain or enhance the electrical conductivity at the targeted area.

There are several advantages to enhancing the conductivity of the target soil layer or zone. Increasing the conductivity of this zone enhances the conductivity contrast between the adjacent more permeable zones and the target zone. This means that less current will be shunted around the target zone, that is, more current will be delivered to the target zone during the joule heating process. Also, in the conventional joule heating process, 50% of the dissipation is lost to the region that is exterior to the electrode array, that is, half of the electrical energy for heating is wasted. Increasing the conductivity of the target region interior to the joule heating electrodes by electro-osmotic infusion of enhanced electrolyte will skew the volumetric current distribution so that more than 50% of the current is converted to joule heating in the region interior to the heating electrodes.

Figure 2:
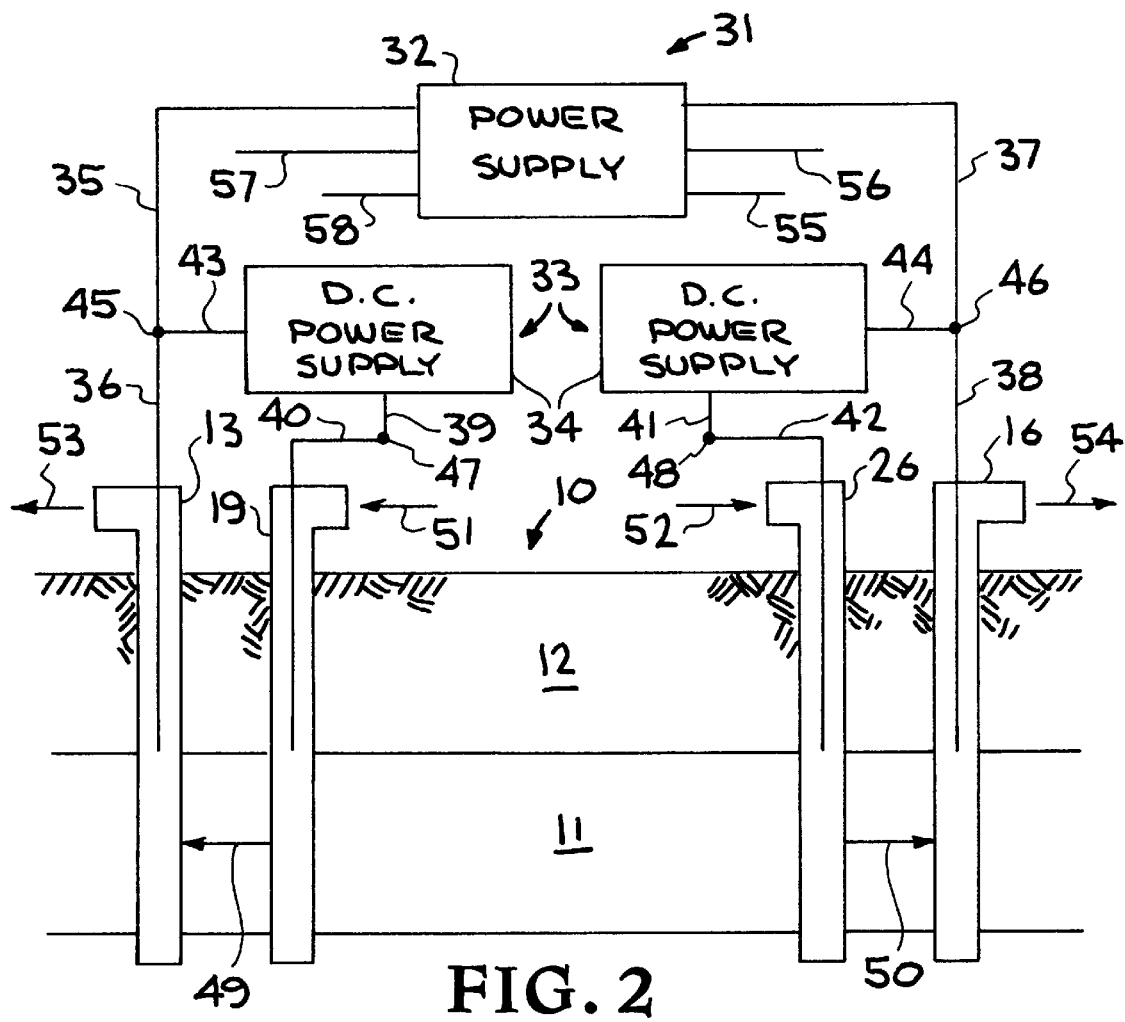
FIG. 2 is an enlarged cross-sectional view of the target area soil formation in which the electrode array of FIG. 1 is located, and schematically illustrates the electrical power supplies for the electrodes and the fluid flow of this embodiment.

The direction of the induced flow is either toward the joule heating (JH) electrodes wherein the JH electrodes function as a sink, or away from the JH electrodes where they function as a source. FIGS. 1 and 2 illustrate an electrode arrangement wherein the electro-osmotic flow is in the direction of the JH electrodes. Electro-osmotic flow is locally induced by applying a dc potential between two or more electrodes. As shown in the embodiment of FIGS. 1 and 2, the dc potential is applied between inner electro-osmotic (EO) electrodes and the joule heating/electro-osmotic (JH/EO) electrodes.

Estimates indicate that up to several kW of cooling per meter length of electrode may be achieved with electro-osmotic transport This induced flow can either remove heat (flow toward the JH/EO electrodes from the high heat region adjacent to these electrodes or it can carry the heat out away from the JH/EO electrodes to aid the thermal diffusion of heat into the interior region that is the target of the heating efforts. Besides moving groundwater or electrolyte to minimize the potential for overheating and dryout near the JH/EO electrodes, the electrolyte that is added through either the JH/EO or EO electrode wells helps maintain saturation in the near-electrode zone and can be chemically tailored to increase both its ionic conductivity and boiling point. Increasing ionic conductivity near the heating electrodes will decrease the amount of excess heating there and increasing the boiling point of the electrolyte in that region will work towards preventing dryout.

FIGS. 1 and 2 show how the invention works for a possible, but not unique electrode distribution. Other workable electrode patterns and electrical circuits could be used to induce near-electrode groundwater flows both before and during joule heating operations. For example, the array of electrode triads shown in FIGS. 1 and 2 could be reconnected so that two electrodes were joule heating/electro-osmotic electrodes (JH/EO) and only the remaining one electrode of each triad was dedicated to electro-osmosis (EO). The advantage of this modified triad arrangement is the lowering of joule heating currents in the near-electrode soil zone which reduces non-uniform heating and reduces the excess heat production that the electro-osmotic flows must mitigate. Other electrode configurations, such as a plurality of EO electrodes located and electrically interconnected to tailor the conductivity throughout the target soil layer, and greater densities of deployment, not shown, could be used for inducing layer-wide flows in the region interior to the normally annular or circular heating electrode array.

While the heating electrodes of an array are generally separated by 50 feet or more across a zone of contamination, the density of electrode placement can be increased to increase the density of the heating of the contamination zone.

Referring now to the drawings, FIGS. 1 and 2 illustrate an electrode pattern or array for heating a zone of soil, indicated at 10, which includes a low permeability target soil layer 11 and layer 12 of higher permeability soil. A primary purpose of the invention is to reduce or prevent shunting of the electrical current through the higher permeability soil layer 12, whereby contaminants in the low permeability soil layer 11 can be extracted therefrom.

The electrode array or pattern illustrated to FIG. 1, which is one of many possible arrangements, comprises six (6) joule heating/electro-osmotic (JH/EO) electrode wells 13, 14, 15, 16, 17 and 18 positioned in a circular arrangement, around the soil zone 10, and six (6) pairs or twelve (12) electro-osmotic (EO) electrode wells 19–20, 21–22, 23–24, 25–26, 27–28, and 29–30, each JH/EO electrode well having a pair of EO electrode wells located in spaced relation thereto. FIG. 2, shown in enlarged cross-section, only illustrates JH/EO electrode wells 13 and 16 and EO electrode well 19 and 26 and the electrical power supplies and connections therefor. However, each of the other JH/EO and EO electrode wells would be similarly electrically connected.

The joule heating electrode well power supply 31 comprises a six-phase alternating current (AC) power supply 32, while the electro-osmotic electrode well power supply 33 comprises a direct current (DC) power supply 34, illustrated for clarity as two power supplies. This particular arrangement is illustrative, but many other arrangements could also be used. The AC power supply 32 is electrically connected to JH/EO electrode wells 13 and 16 via electrical leads 35–36 and 37–38, respectively. The positive (+) side of DC power supply 34 is electrically connected to the EO electrode wells 19 and 26 by electrical leads 39–40 and 41–42, respectively, with the negative (−) side of DC power supply 34 being electrically connected by leads 43 and 44 to interconnect points 45 and 46, respectively of AC power supply leads 35–36 and 37–38. The AC electrical leads for the remaining JH/EO electrode wells are connected to the four remaining phases of the six-phase power supply 32, e.g. by leads 55, 56, 57, 58. DC electrical leads 39–40 and 41–42 include interconnect points 47 and 48, respectively, by which the electrical leads for the remaining EO electrode wells are connected.

Thus, each EO electrode well is electrically connected to an associated JH/EO electrode well, thereby completing the DC circuit via the electrical conductivity of the soil between the EO electrode wells 19 or 26 and the adjacent JH/EO electrode wells 13 or 16. The electrode/electrical set up shown in FIGS. 1–2 is for illustration purposes only. Other electrode arrangements with other power supply arrangements would work just as well. For six electrodes six phase power is preferable, but three phase or two phase AC could also be used. In particular, the entire system could be DC, i.e., the heating electrodes can be DC as well as the EO electrodes.

In operation of the FIGS. 1–2 embodiment prior to or during the joule heating operation of the JH/EO electrode wells, the EO electrode wells DC power supply 34 is activated, inducing fluid flow by electro-osmosis as indicated by arrows 49 and 50, and fluid (electrolyte) may be added, when desired, via the EO electrode wells 19 and 26, as indicated by arrows 51 and 52. The induced fluid flow (49–50) prevents dryout of the low permeability soil layer 11 adjacent the joule heating electrodes, and in addition, where cold fluid (electrolyte) is added as indicated at 51 and 52 via the EO electrode wells 19 and 26, hot fluid can be removed via the JH/EO electrode wells 13 and 16, as indicated by arrows 53 and 54. By reversing the DC power supply polarity to the EO and JH/EO electrode the induced fluid flow by electro-osmosis would be in an opposite direction, and addition of the electrolyte, when desired, would be via the JH/EO electrode wells. Also, by electrically interconnecting and selectively positioning the EO electrode wells in the target soil zone 10, fluid (electrolyte) can be added to condition the electrical conductivity of the interior of the soil zone 10, whereby the joule heating current would flow through the low permeability layer 11 and not be shunted through the higher permeability layer 12 of soil zone 10.

It has thus been shown that by electro-osmotic infusion of ground water or chemically tailored electrolyte, the electrical conductivity of soil undergoing joule heating remediation can be enhanced, maintained, or reconditioned. The problems of non-uniform heating of near-electrode soils associated with soil remediation by joule heating are eliminated by the present invention. The joule heating when combined with electro-osmotic infusion can be effectively utilized to remove volatile contaminants, such as gasoline products, from low permeability soil layers, such as clay. The invention also enables tailoring of the electrical conductivity of the soil throughout the target layer, and can be used to condition the electrical conductivity of the soil before and during the joule heating operation.

While a particular embodiment, materials, parameters, etc. have been set forth to exemplify and explain the principles of the invention, such are not intended to be limiting. Modifications and changes may become apparent to those skilled in the art, and it is intended that the invention be limited only by the scope of the appended claims.

The invention claimed is:

1. In a soil remediation process using joule heating, the improvement comprising:

electro-osmotic infusing a fluid to enhance, maintain or recondition the electrical conductivity of the soil;

the electro-osmotic infusing being carried out by positioning at least one electrode in the soil adjacent a joule heating electrode, and connecting a direct current power supply to the at least one electrode and to the adjacent joule heating electrode.

2. The improvement of claim 1, wherein the electro-osmotic infusion is carried out by inducing the fluid to flow in a direction.

3. The improvement of claim 1, wherein the fluid is an electrolyte selected from the group consisting of groundwater, chemically modified water, heated water, and a combination thereof.

4. The improvement of claim 1, wherein the electro-osmotic infusion is carried out by also directing a direct current electric field through the soil.

5. The improvement of claim 1, wherein the electro-osmotic infusion is carried out by positioning a plurality of electrodes within a zone of soil surrounded by a plurality of joule heating electrodes, and supplying direct current to at least said plurality of electrodes.

6. The improvement of claim 1, wherein the electro-osmotic infusion of the fluid is carried out by injecting a fluid into either electro-osmostic wells or joule heating electrode wells.

7. The improvement of claim 1, additionally including infusion of a chemically modified and/or heated electrolyte into a zone of the soil to improve the electrical conductivity contrast of the interior of the soil zone.

8. The improvement of claim 1, wherein the electro-osmotic infusion of a fluid is carried out before and during joule heating of the soil.

9. The improvement of claim 1, wherein the electro-osmotic infusion of a fluid is carried out by positioning a plurality of direct current electrodes adjacent each of a plurality of joule heating electrodes positioned to define a remediation soil zone, and electrically connecting a direct current power supply to the plurality of direct current electrodes and to the plurality of joule heating electrodes.

10. The improvement of claim 9, additionally including controlling the direction the electro-osmotically induced fluid flow by changing the polarity of the direct current power supply connections to the direct current electrodes and to the joule heating electrodes.

11. A system for enhancing, maintaining, or reconditioning the electrical conductivity of a layer of soil for extraction of volatile contaminants therefrom, comprising:

a plurality of joule heating electrode wells positioned in spaced locations in the layer of soil, to define a soil zone;

a plurality of electro-osmotic electrode wells positioned in the layer of soil and within the soil zone defined by the joule heating electrode wells;

means for supplying direct or alternating current to the joule heating electrode wells; and means for supplying direct current to the electro-osmotic electrode wells, whereby a flow of fluid through the soil zone is produced by electro-osmosis.

12. The system of claim 11, wherein said joule heating electrode wells and said electro-osmotic electrode wells are constructed to enable injection of a fluid into the soil.

13. The system of claim 12, wherein the injected fluid is selected from the group consisting of water, chemically modified fluid, heated water, and a combination thereof.

14. The system of claim 11, wherein a pair of said electro-osmotic electrode wells are located adjacent each of said joule heating electrode wells.

15. The system of claim 14, wherein each of said joule heating electrode wells is electrically connected to said means for supplying direct current.

16. Electro-osmotic infusion of ground water or chemically tailored electrolyte to enhance, maintain, or recondition the electrical conductivity of soil for a joule heating soil remediation process, comprising:

positioning a plurality of electro-osmotic electrodes within a soil zone defined by a plurality of joule heating electrodes; and supplying direct current to the plurality of electro-osmotic electrodes and to the plurality of joule heating electrodes.

17. The electro-osmotic infusion of claim 16, additionally including injecting a fluid into the soil zone.

18. The electro-osmotic infusion of claim 17, wherein injecting the fluid into the soil zone is carried out by injecting the fluid either through wells containing electro-osmotic electrodes, or through wells containing joule heating electrodes.

19. The electro-osmotic infusion of claim 17, wherein the fluid injected into the soil zone is selected by the group consisting of water and chemically tailored electrolyte.

* * * * *